No. 742,969. PATENTED NOV. 3, 1903.
E. CLAPP, DEC'D.
C. L. FIELD, EXECUTOR.
APPARATUS FOR AUTOMATICALLY FEEDING POULTRY
OR OTHER CREATURES.
APPLICATION FILED FEB. 10, 1902.
NO MODEL.
Fig. 1.
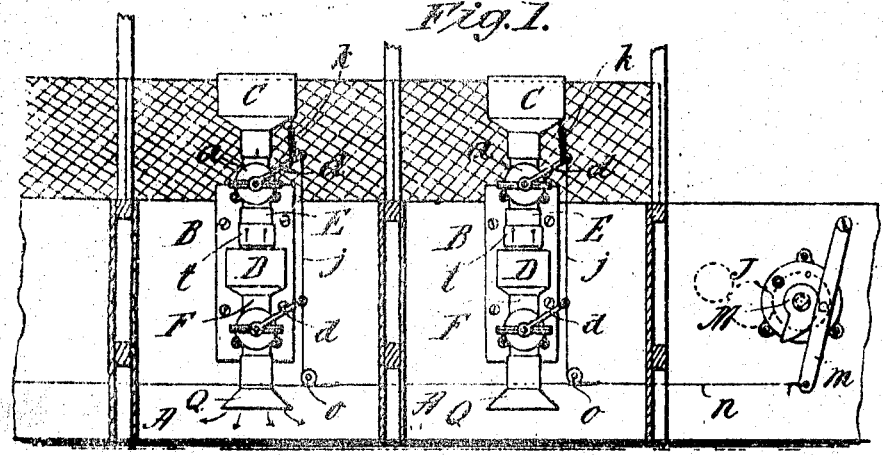
Fig. 2. Fig. 3.
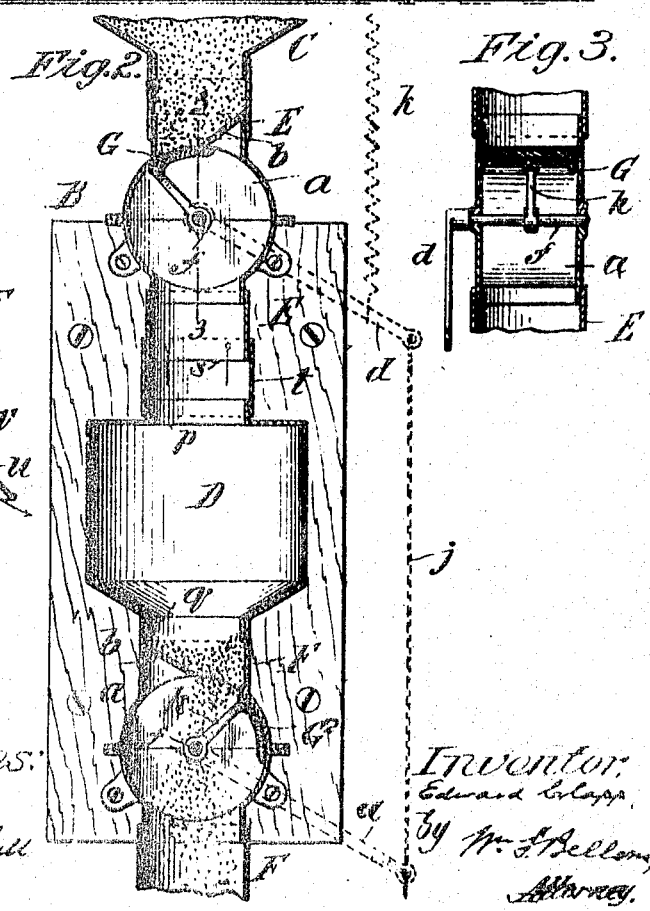
Fig. 4.
Witnesses: Inventor,
Edward Clapp
by M. F. Bellows
Attorney No. 742,969. Patented November 3, 1903.

UNITED STATES PATENT OFFICE.

EDWARD CLAPP, OF MONTAGUE, MASSACHUSETTS; CLIFTON L. FIELD EXECUTOR OF SAID CLAPP, DECEASED.

APPARATUS FOR AUTOMATICALLY FEEDING POULTRY OR OTHER CREATURES.

SPECIFICATION forming part of Letters Patent No. 742,969, dated November 3, 1903.

Application filed February 10, 1902. Serial No. 93,350. (No model.)

*To all whom it may concern:*

Be it known that I, EDWARD CLAPP, a citizen of the United States of America, and a resident of Montague, in the county of Franklin and State of Massachusetts, have invented certain new and useful Improvements in Apparatus for Automatically Feeding Poultry or other Creatures, of which the following is a full, clear, and exact description.

This invention relates to improved apparatus for delivering grain or other feed automatically to poultry or other creatures and preferably at certain fixed and predetermined times.

The objects of the invention are to provide devices of the character indicated which are simple and inexpensive of construction, practical and certain of operation, having little liability of derangement in protracted use, and to enable at pleasure a change in the quantity of the grain or feed which will be automatically delivered.

The invention comprises as prominent and important features thereof, in combination with the feed-supply receptacle having a downwardly-discharging conduit, a measuring service-receptacle, into the top of which said conduit leads and which itself has a downwardly-discharging conduit, reversely-operating valves or shut-offs in the conduits above and below the measuring-receptacle, and means for operating said valves simultaneously or substantially so in reverse directions; and the invention furthermore contemplates as the means for automatically operating the shut-off valves above and below the measuring service-receptacles, a clockwork device with suitably-guided flexible connections between a part operated by the clockwork and the means which reversely operate the shut-off valve; and the invention furthermore consists in certain specific constructions and combinations of parts, all substantially as hereinafter described and shown, and set forth in the claims.

In the accompanying drawings, Figure 1 is an elevation showing automatic feed-delivering devices applied in two separate scratching yards or pens for poultry with the means in common thereto simultaneously controlling the feed-delivery. Fig. 2 is a central vertical section through one of the measuring or automatic delivering devices. Fig. 3 is a sectional view vertically on the line 3 3, Fig. 2. Fig. 4 is a sectional view of the radial spreading device for the feed which is provided at the lower end of the delivery-conduit for each of the feeding devices.

Similar characters of reference indicate corresponding parts in all of the views.

In the drawings, A A represent separate yards or pens, in each of which one of the feed-delivering devices B is provided, and each of these comprises a bin or feed-supply receptacle C, a measuring-receptacle D, a conduit E between and connecting the lower end of the supply-receptacle with the measuring-receptacle, a downwardly-directed discharging-conduit F, leading from the bottom of the measuring-receptacle, and shut-off valves G and $G^2$ in the conduits above and below the receptacle G, which are so adjusted and operative conjointly that when the upper one is closed the lower one will be open, and vice versa.

The tubular conduit E above receptacle D and the one F therebelow are both provided or constructed with the cylindrical casing $a$, the opening into each of which is preferably somewhat contracted by the downwardly-inclined supplemental wall $b$, as shown in Fig. 2, and mounted axially in and through each of these casings $a$ is a shaft $f$, free for partial rotation, having lever-arm $d$ externally of the casing and a radial arm $h$ internally, such arm in the upper casing having the arc-shaped shut-off valve G, while the one in the lower casing has a similar valve $G^2$; but these valves are so adjusted that the one closes the entrance into the receptacle D, while the other leaves free opening for delivery therefrom, or vice versa, as the case may be.

The levers $d$ $d$ are united by the cord or other suitable connection $j$, and each upper lever has the spring $k$ therewith connected.

J represents a clockwork device, on the shaft or arbor of which is a cam M, having an abrupt or decided drop therein, and with this cam coöperates the pivoted lever $m$ to receive periodically, as governed by the clockwork, a reciprocatory motion. The cord or chain $n$ is connected to this lever and has connection, respectively, with the united levers $d\ d$, suitable guiding devices, as sheaves $o\ o$, being provided.

The supply-receptacles C may be many times as large as the measuring-receptacles D, and with a quantity of grain or other feed in the bins C when the clockwork and the coöperating springs $k$ permit the levers to have their upwardly-inclined positions shown in Fig. 1 (the reverse of those shown in Fig. 2) the lower valve $G^2$ will be closed and the upper one G open, so that the receptacle D and the portions of the conduits between it and the valves, which may be regarded as parts of the measuring-receptacle, will be filled with the grain or feed. When the cam crowds the lever $m$ toward the right, drawing on the cord $n$ and the therewith connected and joined levers $d\ d$, the positions of the valves $G\ G^2$ will be reversed, so that while the feed in the receptacle D is being delivered no feed can come down into the measuring-receptacle from above, which may, however, be permitted in due season when the clock-controlled cam permits the next reversal of the valve.

Inasmuch as it may be desirable under different circumstances to vary the quantity of feed which shall be automatically delivered, provisions are made whereby the measuring-receptacle D comprises a section or portion which may be detached to be interchanged or replaced by another of substantially the same height, but of greater width and capacity, and it will be perceived that the cylindrical receptacle D has its bottom and also its top constructed with annular throat-flanges $p$ and $q$, the lower one telescoping within the upper end portion of the tubular conduit F, while the upper edge of the upper throat-flange is located at some little distance below the lower end $s$ of the conduit E, and the sleeve $t$, which slides vertically on the lower end portion of the conduit E, when slid to its lowermost position telescopes over and forms the connection and continuity of the conduit E with the throat-flange of the measuring-receptacle, this connection being easily broken by upwardly sliding the sleeve, leaving the receptacle D free to be lifted out of connection with conduit F and laid aside to be replaced by a measuring-holder, which may be fitted in the aforementioned connections.

The spreading appliances Q, provided at the bottom of each downwardly-discharging conduit F, are each composed of several separated concentric funnel-shaped rings $u\ u$, each inner one being supported from the one outside thereof by the stay-pieces $v$, and the outer ring has at its smaller upper end the upwardly-extending curved spring-arms $w\ w$, which are crowded into the lower end of the tubular conduit F against their spreading reaction. These annular funnel-shaped rings may be plain or corrugated, and the contracted mouth of each inner one being below and smaller than the mouth of the ring-section next outside thereof insures that the grain will in its descent be more or less separated and radially deflected.

The action of the clock may be anticipated by drawing on the cord $n$ by hand if an earlier feeding than that to be insured by the clock might on occasion be desired.

Having thus described my invention, what I claim, and desire to secure by Letters Patent, is—

1. In an apparatus of the character described, the combination with a feed-supply receptacle having a downwardly-discharging conduit, of a measuring service-receptacle, into the top of which said conduit leads and having a downwardly-discharging conduit at its bottom, said measuring-receptacle being detachably connected to the said conduits above and below it, whereby another of different capacity may be interchanged therefor, reversely-operating valves or shut-offs in the conduits above and below said measuring-receptacle, means for operating said valves, reversely, a clockwork-actuated cam, a lever coacting therewith, a connection between such lever and the said valve-operating means and a spring against which said levers work in one direction and by which they are moved in the opposite direction, substantially as described.

2. In an apparatus of the character described, the combination with a feed-supply receptacle having a downwardly-discharging conduit, of a measuring-receptacle into the top of which said conduit leads, and having a downwardly-discharging conduit at its bottom and said conduits above and below the measuring-receptacle comprising cylindrical casings, axial shafts mounted in said casings and having arms carrying arc-shaped cut-off valves which are adjusted so that the upper one will be closed while the lower one is open, and vice versa, levers extended from said shafts and means for operating said levers for relatively reversing the positions of the valves, for the purpose set forth.

3. In an apparatus of the character described, the combination with a feed-supply receptacle having a downwardly-discharging conduit, of a measuring-receptacle below and in line with said conduit having upper and lower annular throat-surrounding flanges, and having a discharging-conduit below and in line with said measuring-conduit, said latter conduit having telescopic engagement with the lower end flange of the measuring-receptacle, a sleeve vertically slidable on the upper conduit and telescopically engaging the upper end flange of the measuring-receptacle, the cut-off valves, and means for operating them, substantially as and for the purposes explained.

4. The combination with a plurality of devices comprising feed-supply receptacles having downwardly-discharging conduits, measuring-receptacles therewith connected having downwardly-discharging conduits at their bottoms, and said conduits above and below the measuring-receptacles comprising cylindrical casings, shafts arranged axially relative to the respective cylindrical casings, each carrying a shut-off valve, and operating-levers respectively connected to said shafts, of a retracting-spring connected with one of each pair of valve-operating levers, flexible connections uniting both of said levers of each feed-supply device, a cord or like connection in common to the several devices and having connection with the lever-uniting connections, a rotatable cam and means for imparting its rotational movement thereto, and a lever coacting with said cam and with which the said common cord is connected, substantially as described.

5. In a feed device, the combination with a supply-receptacle having a downwardly-discharging conduit, of a measuring-receptacle therewith connected, having a downwardly-discharging conduit, which has at its bottom an appliance composed of several separated funnel-shaped rings, one within and supported by another and having the upwardly-extended separated retention-springs adapted for engagement within the lower end of the aforementioned lower conduit, cut-off valves in the conduits above and below said measuring-receptacle, and means for simultaneously operating them, substantially as described.

Signed by me at Springfield, Massachusetts, in the presence of two subscribing witnesses.

EDWARD CLAPP.

Witnesses:
WM. S. BELLOWS,
M. A. CAMPBELL.